United States Patent
Ho

(10) Patent No.: US 11,021,214 B2
(45) Date of Patent: Jun. 1, 2021

(54) SYSTEM FOR A BICYCLE

(71) Applicant: SRAM, LLC, Chicago, IL (US)

(72) Inventor: Alexander Kon-I Ho, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 142 days.

(21) Appl. No.: 16/268,026

(22) Filed: Feb. 5, 2019

(65) Prior Publication Data

US 2020/0247504 A1 Aug. 6, 2020

(51) Int. Cl.
| | |
|---|---|
| *B62M 25/08* | (2006.01) |
| *B62L 3/02* | (2006.01) |
| *B62K 23/06* | (2006.01) |
| *H04W 76/14* | (2018.01) |
| *H04W 8/00* | (2009.01) |
| *B62J 1/08* | (2006.01) |

(52) U.S. Cl.
CPC ............... *B62M 25/08* (2013.01); *B62J 1/08* (2013.01); *B62K 23/06* (2013.01); *B62L 3/02* (2013.01); *H04W 8/005* (2013.01); *H04W 76/14* (2018.02); *B62J 2001/085* (2013.01)

(58) Field of Classification Search
CPC ...... B62M 25/08; B62M 9/122; B62M 9/132; B62L 3/02; B62K 23/06; B62J 1/08; B62J 2001/085; B62J 45/00; H04W 76/14; H04W 8/005
See application file for complete search history.

(56) References Cited

U.S. PATENT DOCUMENTS

| | | | |
|---|---|---|---|
| 8,655,548 B2 | 2/2014 | Ichida et al. | |
| 9,229,712 B2 | 1/2016 | Takamoto et al. | |
| 9,491,788 B1* | 11/2016 | Kasai | ................... G06K 7/1417 |
| 2016/0152302 A1* | 6/2016 | Nishino | ................. B62M 25/08 |
| | | | 701/2 |
| 2016/0257370 A1 | 9/2016 | Hashimoto et al. | |
| 2017/0008465 A1* | 1/2017 | Kasai | ..................... B62M 9/132 |

(Continued)

FOREIGN PATENT DOCUMENTS

| | | |
|---|---|---|
| CN | 103723238 | 4/2014 |
| CN | 106256678 | 12/2016 |

(Continued)

*Primary Examiner* — Mary Cheung

(57) ABSTRACT

A bicycle system includes controller devices. Each controller device includes at least one respective input element configured to receive input from a user. The system includes operation-enacting devices. Each operation-enacting device is configured to enact at least one respective operation on the bicycle. The system includes a network coordinator device configured to (i) establish a wireless network for communications between the network coordinator device, the controller devices, and the operation-enacting devices, and (ii) transmit to the operation-enacting devices, via the wireless network, a roster identifying the controller devices and the operation-enacting devices paired to the wireless network. The controller devices are configured to transmit to the operation-enacting devices, via the wireless network, signals indicating input received by the input elements of the controller devices. The operation-enacting devices are configured to determine, based on the roster, how to enact the operations responsive to the signals received from the controller devices.

20 Claims, 15 Drawing Sheets

(56) References Cited

U.S. PATENT DOCUMENTS

2017/0043828 A1\* 2/2017 Mohamed .............. B62H 5/141
2019/0002053 A1 1/2019 Kakinoki

FOREIGN PATENT DOCUMENTS

| CN | 106467159 | 3/2017 |
| CN | 107600250 | 1/2018 |
| EP | 2719616 | 4/2014 |
| TW | 201138374 | 11/2011 |

\* cited by examiner

SYSTEM FOR A BICYCLE

BACKGROUND

A bicycle includes various components that allow a user to control the operation of the bicycle. For instance, the bicycle may include a drivetrain where one or more gears can be selectably engaged with a drive chain to modify pedaling cadence and resistance. Correspondingly, the bicycle may include controller devices that receive input from the user to cause the drive chain to engage different gears.

SUMMARY

According to aspects of the present disclosure, embodiments provide systems, devices and methods for controlling components on a bicycle. According to an example embodiment, a system for a bicycle includes a plurality of controller devices, wherein each controller device includes at least one respective input element configured to receive input from a user. The system includes a plurality of operation-enacting devices, wherein each operation-enacting device is configured to enact at least one respective operation on the bicycle. The system includes a network coordinator device configured to (i) establish a wireless network that enables communications between the network coordinator device, the controller devices, and the operation-enacting devices, and (ii) transmit to the operation-enacting devices, via the wireless network, a roster identifying the controller devices paired to the wireless network and the operation-enacting devices paired to the wireless network. The controller devices are further configured to transmit to the operation-enacting devices, via the wireless network, signals indicating input received by the input elements of the controller devices. The operation-enacting devices are configured to determine, based on the roster received from the network coordinator device, how to enact the operations responsive to the signals received from the controller devices.

According to another example embodiment, a network coordinator device for a bicycle includes a first communication interface configured to communicate wirelessly with a plurality of controller devices and a plurality of operation-enacting devices. Each controller device includes at least one respective input element configured to receive input from a user, and each operation-enacting device is configured to enact at least one respective operation on the bicycle. The network coordinator device includes one or more processors configured to execute program instructions stored on computer-readable media, which when executed cause the one or more processors to: (i) establish, via the first communication interface, a pairing session that allows the controller devices and the operation-enacting devices to be paired to a wireless network, and (ii) transmit to the operation-enacting devices, via the first communication interface, a roster identifying the controller devices and the operation-enacting devices paired to the wireless network. The wireless network allows the controller devices to transmit to the operation-enacting devices signals indicating input received by the input elements of the controller devices, thereby causing the operation-enacting devices to enact the operations based on the roster.

According to yet another example embodiment, a controller device for a bicycle includes at least one input element configured to receive input from a user and to provide a signal in response to the input. The controller device includes a communication interface configured to communicate wirelessly with a network coordinator device and a plurality of operation-enacting devices, and is further configured to transmit a device type identification to the network coordinator device. The network coordinator device is configured to establish a pairing session to pair the controller device, other controller devices, and the operation-enacting devices to a wireless network, the network coordinator device pairing the controller device to the wireless network only if the device type identification is different from device type identifications associated with the other controller devices and the operation-enacting devices. The communication interface is further configured to transmit, via the wireless network, the signal from the at least one input element to the operation-enacting devices, the signal causing one of the operation-enacting devices to enact at least one operation on the bicycle.

According to a further embodiment, an operation-enacting device for a bicycle includes at least one movable component configured to modify an operative state of the bicycle. The operation-enacting device includes a communication interface configured to communicate wirelessly with a network coordinator device, a plurality of controller devices and other operation-enacting devices. The network coordinator device establishes a pairing session to pair the operation-enacting device, the controller devices, and other operation-enacting devices to a wireless network. The communication interface receives (i) from the network coordinator device, a roster identifying the controller devices and other operation-enacting devices paired to the wireless network, and (ii) from the controller devices, signals indicating input received by input elements of the controller devices. Based on the roster received from the network coordinator, the at least one movable component modifies the operative state of the bicycle responsive only to the signals from a single assigned controller device or a single assigned particular combination of controller devices.

Figure 1A:
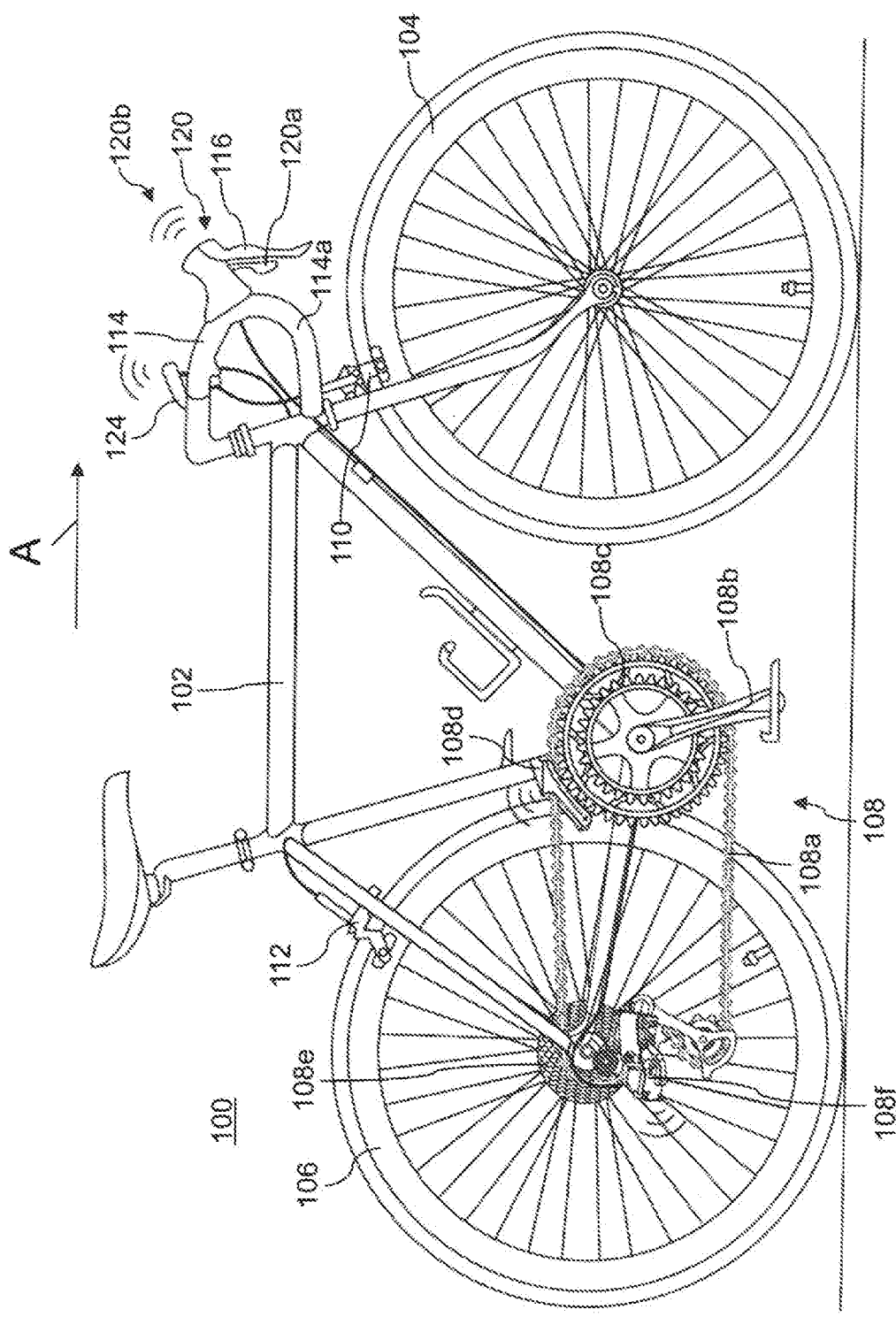
FIG. 1A illustrates a right-side view of an example road bicycle that can implement aspects of the present disclosure.

Other aspects and advantages of the embodiments disclosed herein will become apparent upon consideration of the following detailed description, wherein similar or identical structures have similar reference numerals. Various embodiments of the invention will be described herein with reference to the drawings. It will be understood that the drawings and the description set out herein are provided for illustration only and do not limit the invention as defined by the claims appended hereto and any and all their equivalents.

DETAILED DESCRIPTION

According to aspects of the present disclosure, embodiments provide systems, devices and methods for controlling components on a bicycle. The embodiments employ a plurality of controller devices that receive input from a user to control operation-enacting devices on the bicycle. Operation-enacting devices generally include at least one movable component configured to modify an operative state of the bicycle. The controller devices and the operation-enacting devices are paired to a wireless network. When a particular controller device receives an input from the user, the particular controller device sends a corresponding signal to the operation-enacting devices paired to the network. Embodiments employ a set of assignments to determine which, if any, of the operation-enacting devices responds to the signal from the particular controller device. Advantageously, the set of assignments can be modified by the user according to the user's preferences. In other words, the embodiments provide a reconfigurable control system for the components of the bicycle.

Although the ability to reconfigure the control system may be a desirable feature, there may be concern over whether unknown devices can access and make unwanted modifications to the control system over the wireless network. The embodiments, however, can secure the control system against such access by unknown devices. According to one approach, the embodiments initiate a pairing session that allows the user to select controller devices and operation-enacting devices for the wireless network. Once the pairing session is complete, the roster of devices paired to the network is fixed and unchangeable, even though the assignments between the controller devices and the operation-enacting devices already on the network can still be changed by the user. As such, unknown devices cannot join the wireless network and interfere with the control system.

According to another approach, the embodiments may not allow duplicate device types to be paired to the wireless network, so that an unknown device cannot imitate another device type that has already been selected for pairing. According to yet another approach, the embodiments may only permit each operation enacted by an operation-enacting device to occur in response to the signals from a single assigned controller device or a single assigned particular combination of controller devices, thereby reducing the likelihood of an unwanted response by an operation-enacting device to a signal from an unknown device. Moreover, the embodiments may employ a proprietary network protocol to enhance security by limiting access to the wireless network to devices that can operate under the protocol.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
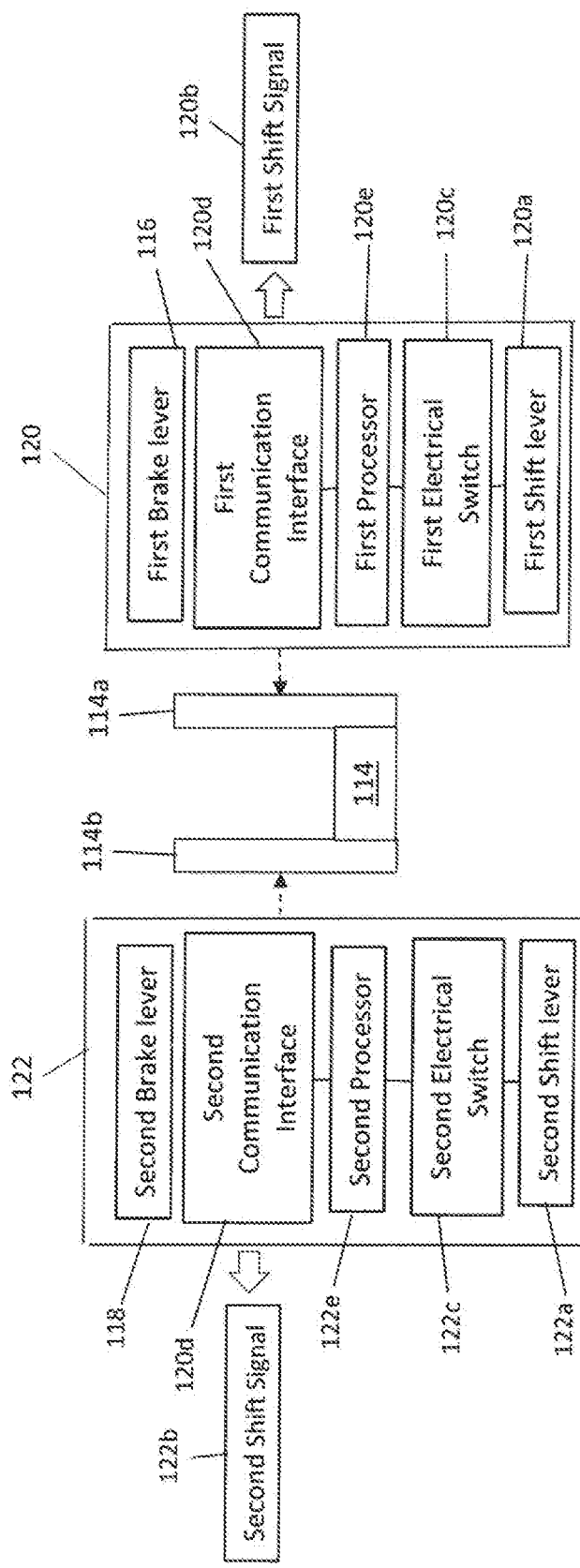
FIG. 1B illustrates a schematic diagram of a handlebar assembly of the example road bicycle shown in FIG. 1A and other components coupled to the handlebar assembly.

FIG. 1B illustrates a schematic diagram depicting the handlebar assembly 114 and other components coupled to the handlebar assembly 114. As shown in FIGS. 1A and/or 1B, the handlebar assembly 114 includes a right drop bar 114*a* and a left drop bar 114*b* to accommodate the left and right hands of the user, respectively. Additionally, the bicycle 100 includes a first or right controller device 120 coupled to the right drop bar 114*a*. The first controller device 120 includes a first or right brake lever 116 to allow the user to operate the rear brake 112. Correspondingly, the bicycle 100 includes a second or left controller device 122 coupled to the left drop bar 114*b*. The second controller device 122 includes a second or left brake lever 118 to allow the user to operate the front brake 110.

Figure 1C:
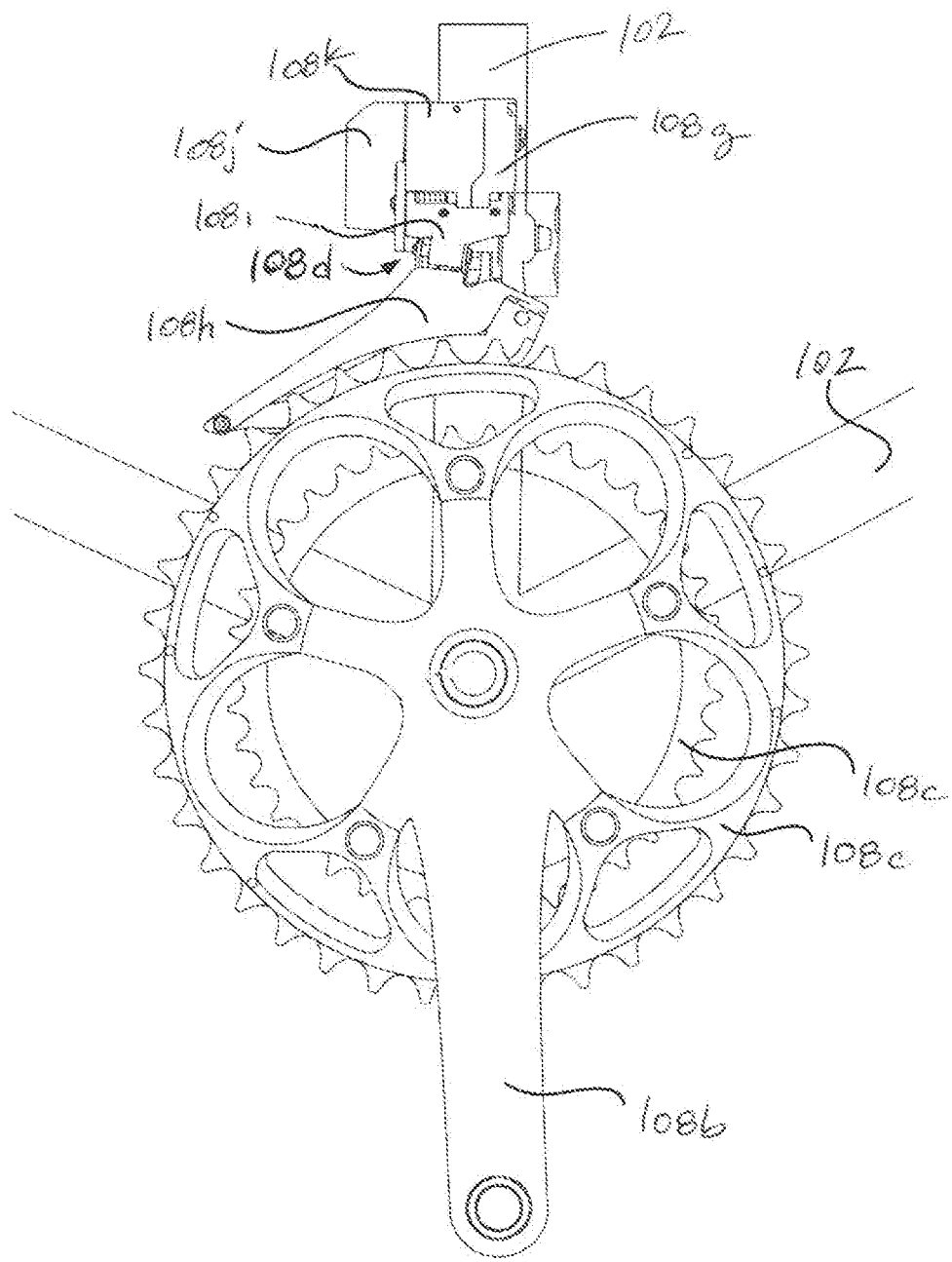
FIG. 1C illustrates a side view of a front derailleur of the example road bicycle shown in FIG. 1A.
Figure 1D:
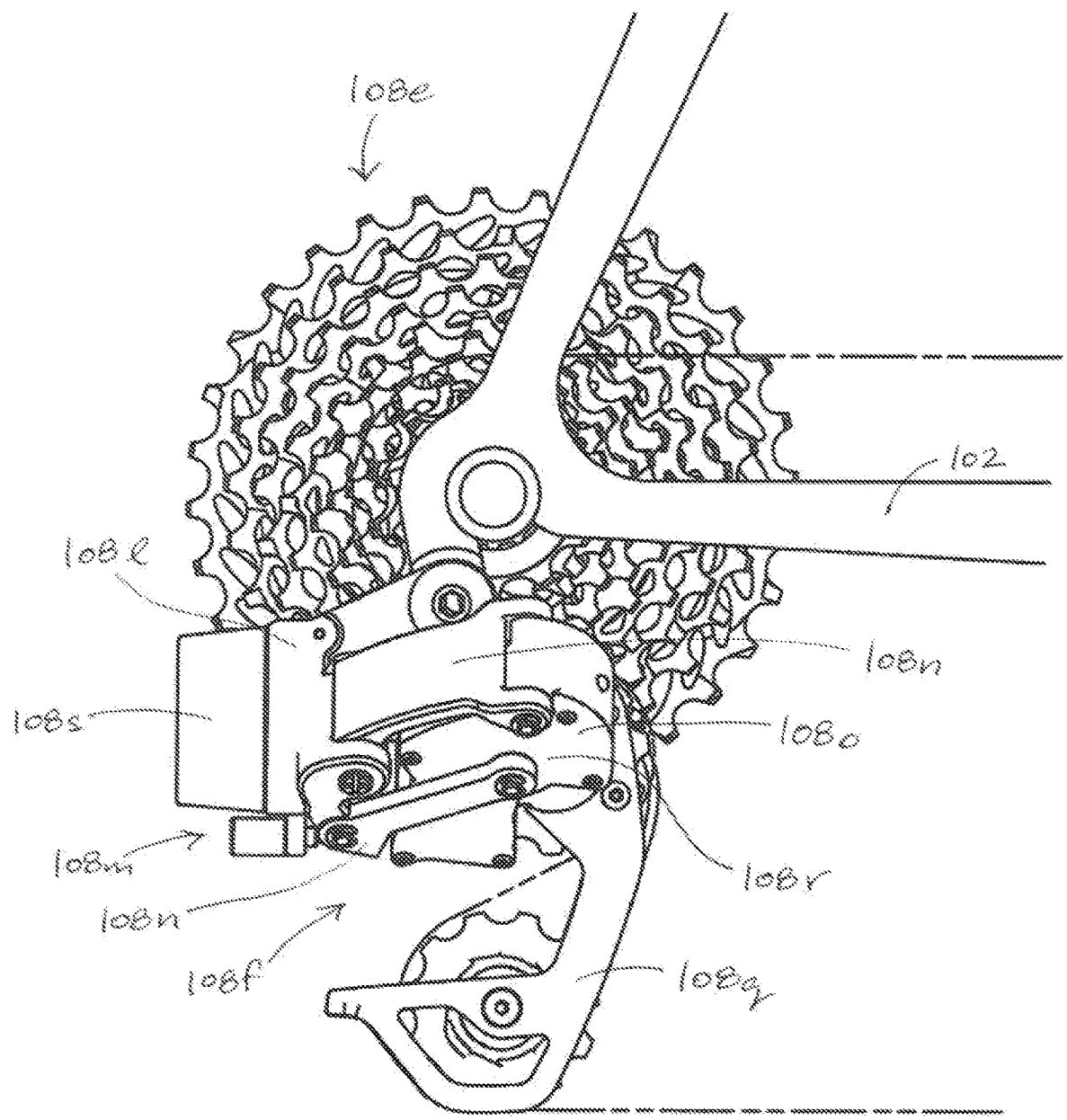
FIG. 1D illustrates a side view of a rear derailleur of the example road bicycle shown in FIG. 1A.

As shown in FIGS. 1A, 1C and 1D, the drivetrain 108 includes a drive chain 108*a*, a front crank 108*b*, front chainrings 108*c*, a front gear changer such as an electromechanical front derailleur 108*d*, rear sprockets 108*e*, and a rear gear changer such as an electromechanical rear derailleur 108*f*. The front chainrings 108*c* are coupled to the front crank 108*b*. The diameters and number of teeth on the front sprockets 108*c* may differ from each other. The rear sprockets 108*e* are coaxially mounted to the rear wheel 106. The diameters and the numbers of teeth on the rear sprockets 108*e* may gradually decrease from left to right. Alternatively, the diameters and the numbers of teeth on the rear sprockets 108*e* may gradually decrease from right to left. The chain 108*a* engages a selected chainring 108*c* and a selected sprocket 108*e*.

To drive the bicycle 100, the user can pedal to rotate the front crank 108*b* relative to the frame 102. Rotation of the front crank 108*b* causes the selected chainring 108*c* to rotate and the chain 108*a* to move through the drivetrain 108. Movement of the chain 108*a* causes corresponding rotation of the selected sprocket 108*e* and thus the rear wheel 106. Rotation of the rear wheel 106 against the ground may propel the bicycle 100 in a forward direction. The front and/or forward orientation and movement of the bicycle 10 is indicated by the direction of arrow "A." Further, other terms relating to direction may be used herein. For example, the "inboard" and "outboard," and "left" and "right" may be used. The terms "right," "left," and "inboard" and "outboard" describe a position between parts or items and a vertical plane substantially bisecting the bicycle or a direction toward or away from the vertical plane substantially bisecting the bicycle. Moreover, terms such as "front" and "rear" referred to bicycle mechanisms conventionally mounted to the bicycle and with the bicycle oriented in the forward direction.

The selected chainring 108c and the selected sprocket 108e, in combination, determine a gear ratio for driving the bicycle 100. Operation of the front derailleur 108d allows the user to change the selected chainring 108c engaged by the chain 108a. In particular, the front derailleur 108d can be actuated to shift the chain 108a left or right from one chainring 108c to the other. The front derailleur 108d is shown as a wireless electrically-actuated front derailleur mounted to the frame 102. The front derailleur 108d may include a base member 108g mounted to the bicycle frame 102 and a chain guide assembly 108h or cage movably connected to the base member 108g by a front linkage 108i in the form of a parallelogram. A front power supply 108j, in this embodiment a removable battery, may be mounted on the front derailleur 108d. The front power supply 108j may supply power to a front motor unit 108k. The front motor unit 108k is configured to supply torque to the components of the front derailleur 108d to move the chain guide assembly 108h relative to the front base member 108g such that the front derailleur 108d may shift the chain 108a between the front sprockets 108c.

Meanwhile, operation of the rear derailleur 108f allows the user to change the selected sprocket 108e engaged by the chain 108a. In particular, the rear derailleur 108f can be actuated to shift the chain 108a left or right from one sprocket 108e to another. The rear derailleur 108f is shown as a wireless electrically-actuated rear derailleur mounted to the frame 102. The rear derailleur may include a base member 108l (e.g., a b-knuckle) that is mounted to the bicycle frame 102. A linkage 108m may include two links 108n that are pivotally connected to the base member 108l. A movable member 108o (e.g., a p-knuckle) may be connected to the linkage 108m. A chain guide assembly 108q or cage may be configured to engage and maintain tension in the chain 108a and may be pivotally connected to a part of the movable member 108o.

A motor unit 108r and rear power supply 108s, in this embodiment a removable battery, are disposed on the rear derailleur 108f. The battery 108s supplies power to the motor unit 108r. In this embodiment, the motor unit 108r is disposed in the movable member 108o. Alternatively, the motor unit 108r may be disposed in one of the links 108n or in the base member 108l. The motor unit 108r may include a motor and a gear transmission. The motor unit 108r may be coupled with the linkage 108m to laterally move the cage 108q and thus shift the chain 108a among the rear sprockets 108e.

Figure 1E:
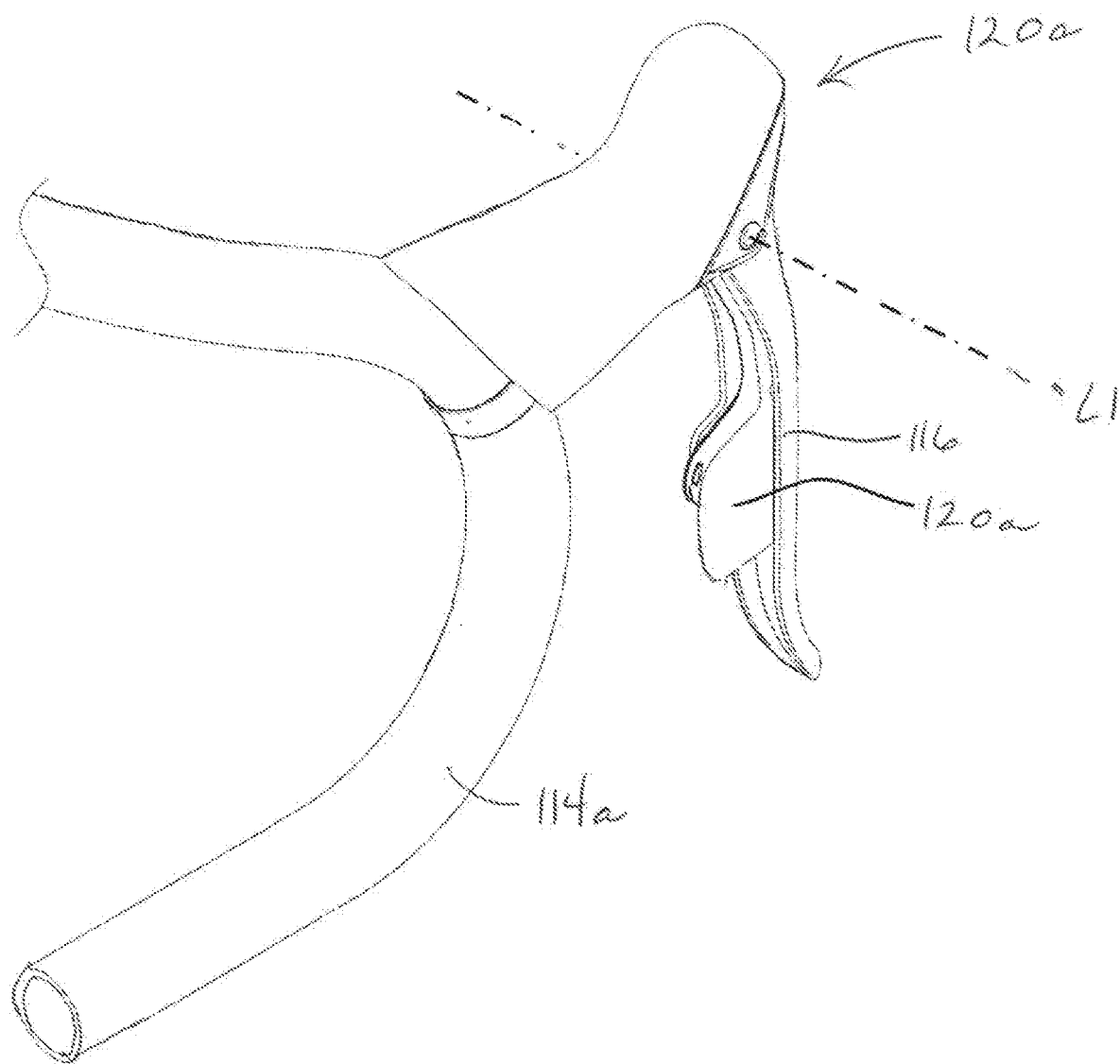
FIG. 1E illustrates a side view of a right controller device of the example road bicycle shown in FIG. 1A coupled to a right drop bar.

Looking to FIGS. 1A, 1B and 1E, to allow the user to operate the front derailleur 108d or the rear derailleur 108f, the first and second controller devices 120, 122 include first and second electrical switches 120c, 122c, that are actuated by first and second input elements, in this embodiment first and second shift levers 120a, 122a, respectively. The first shift lever 120a is configured to receive a right input from the right hand of the user and actuate the first electrical switch 120c. The second shift lever 122a configured to receive a left input from the left hand of the user and actuate the second electrical switch 122c. The first shift lever 120a may be positioned behind to the first brake lever 116, while the second shift lever 122a may be positioned behind to the second brake lever 118.

To provide the right input to the first shift lever 120a, the user can manually apply pressure on the right side of the first shift lever 120a. In response, the first shift lever 120a may pivot about a first shift lever axis L1 from an initial rest position to a shift actuation position. The first shift lever 120a may be biased with a spring or the like so that when the manual pressure is no longer applied by the user, the first shift lever 120a returns to the initial rest position. Similarly, to provide the left input to the second shift lever 122a, the user can manually apply pressure on the left side of the second shift lever 122a. In response, the second shift lever 122a may pivot about a second shift lever axis L2 (not shown) from an initial rest position to a shift actuation position. The second shift lever 122a may be biased with a spring or the like so that when the manual pressure is no longer applied by the user, the second shift lever 122a returns to the left starting position.

The first and second controller devices 120, 122 include first and second controller processors 120e, 122e, which electronically process the manual input received by the first shift lever 120a and the second shift lever 122a, respectively. In particular, the right input triggers a first controller communication interface 120d to wirelessly send a first shift signal 120b, and left input triggers a second controller communication interface 122d to wirelessly send a second shift signal 122b. Correspondingly, the front derailleur 108d and the rear derailleur 108f include communication interfaces and processors that are configured to receive and electronically process the first shift signal 120b and/or the second shift signal 122b to determine a designated response.

In a first scenario, the user provides the right input via the first shift lever 120a but does not provide the left input via the second shift lever 122a. In response, the first controller device 120 sends the first shift signal 120b, while the left controller device 122 sends no signal. When the rear derailleur 108f receives the first shift signal 120b with no second shift signal 122b, the rear derailleur 108f shifts the chain 108a to engage the next smaller sprocket 108e to the right or performs a downshift. Meanwhile, when the front derailleur 108d receives the first shift signal 120b with no second shift signal 122b, the front derailleur 108d remains idle.

In a second scenario, the user provides the left input via the second shift lever 122a but does not provide the right input via the right shift lever 120a. In response, the second controller device 122 sends the second shift signal 122b, while the first controller device 120 sends no signal. When the rear derailleur 108f receives the second shift signal 122b with no first shift signal 120b, the rear derailleur 108f shifts the chain 108a to engage the next larger sprocket 108e to the left or performs a upshift. Meanwhile, when the front derailleur 108d receives the second shift signal 122b with no second shift signal 120b, the front derailleur 108d remains idle.

In a third scenario, the user simultaneously provides the right input via the first shift lever 120a and the left input via the second shift lever 122a. In response, the first controller device 120 sends the first shift signal 120b, and the second controller device 122 sends the second shift signal 122b. When the rear derailleur 108f receives the first shift signal 120b and the second shift signal 122b simultaneously or within a certain time period, the rear derailleur 108f remains idle. Meanwhile, when the front derailleur 108d receives the first shift signal 120b and the second shift signal 122b simultaneously or within a certain time period, the front derailleur 108d shifts the chain 108a left or right to engage a different chainring 108c. In some cases, the drivetrain 108 includes only two chainrings 108c, so the simultaneous right input and left input causes the chain 108a to alternate between the two chainrings 108c.

In some embodiments, the user can manually apply pressure to the first shift lever 120a and/or the second shift lever 122a for varying amounts of time. For instance, without applying pressure to the second shift lever 122a, the user may apply continuous pressure to keep the first shift lever 120a in the left final position for a period that exceeds a threshold amount of time, e.g., approximately one second. In response, the first controller device 120 sends the first shift signal 120b for a corresponding amount of time, i.e., until the user releases the pressure on the first shift lever 120a. When the rear derailleur 108f receives the first shift signal 120b, the rear derailleur 108f determines that the first shift signal 120b exceeds a threshold amount of time. In response, rather than merely shifting the chain 108a to engage the next sprocket 108e to the right, the rear derailleur 108f shifts the chain 108a repeatedly over multiple sprockets 108e to the right until the user releases the pressure on the first shift lever 120a and the first shift signal 120b ceases, or until the chain 108a reaches the right-most sprocket 108e. Alternatively, to shift the chain 108a repeatedly over multiple sprockets 108e to the left, the user may apply continuous pressure to the left shift lever 122a for a period that exceeds the threshold amount of time.

As shown in FIGS. 1A-B, the first controller device 120 and the second controller device 122 employ the first shift lever 120a and the second shift lever 122a as respective input elements to generate corresponding wireless shift signals 120b, 122b to actuate the front derailleur 108d and the rear derailleur 108f. Alternative embodiments, however, may include controller devices with different configurations to control a front derailleur and/or a rear derailleur. For instance, a bicycle may include aerobars with pushbuttons instead of drop bars with shift levers, where the pushbuttons act as input elements that can be pressed by the user to generate wireless signals which can be received and processed by the front derailleur and the rear derailleur. Also, while some controller devices may be coupled to handlebar assemblies, other controller devices may be coupled to other areas of a bicycle, such as locations throughout the frame. Furthermore, other types of controller devices are contemplated. For instance, a unified shifter device may be employed, where the user can press one or more pushbuttons on a mounted box to send signals that control the front derailleur and/or the rear derailleur. Alternatively, a pedal sensor may be employed to receive input from the user via the user's pedaling action and the front derailleur and/or the rear derailleur may respond to a signal from the pedal sensor, e.g., select gears to maintain a desired cadence or pedal resistance.

Figure 2A:
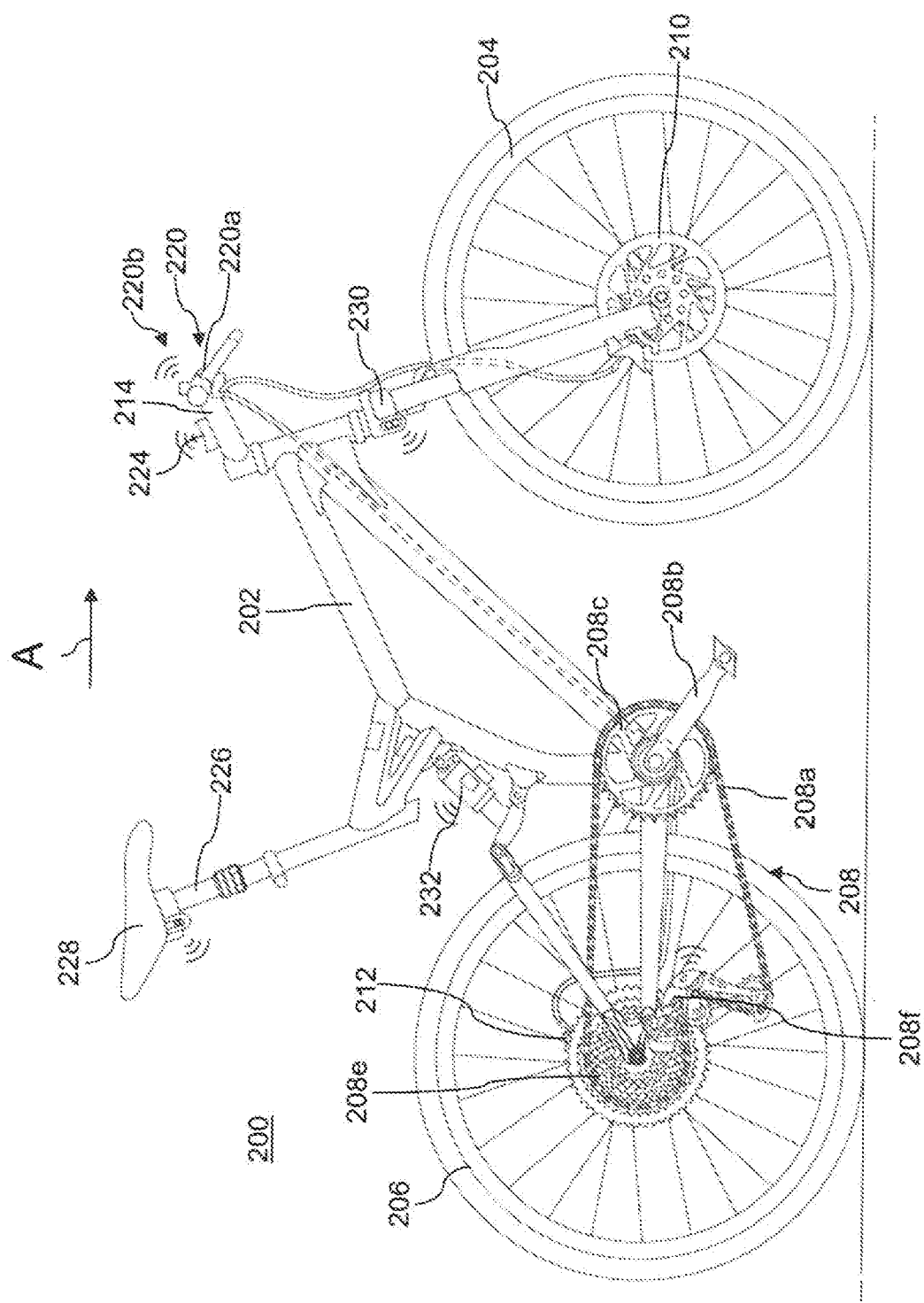
FIG. 2A illustrates a right-side view of an example mountain bicycle that can implement aspects of the present disclosure.

While the example bicycle 100 shown in FIGS. 1A-B is a road bicycle, aspects of the present disclosure may be implemented with bicycles of any type. For instance, FIG. 2A illustrates a right side view of an example mountain bicycle 200. The bicycle 200 includes a frame 202, a front wheel 204, a rear wheel 206, a drivetrain 208, front disk brakes 210, and rear disk brakes 212. The drivetrain 208 includes a chain 208a, a front crank 208b, a front chainring 208c, rear sprockets 208e, and a rear derailleur 208f, which operate in a manner similar to the corresponding components of the drivetrain 108 above.

In contrast to the bicycle 100, the bicycle 200 includes other operating-enacting devices such as a height-adjustable seat post assembly 226 and front and rear suspension systems 230, 232. In FIGS. 2A and 2C, the seat post assembly in shown as a wireless, electrically-actuated seat post assembly 226 that allows the position of a seat 228 to be dynamically adjusted. For instance, the adjustable seat post 226 may include an operable valve (not shown) that allows the seat 228 to be dropped to a lower height during a ride to change the position of the user relative to the frame 202 and achieve better handling. The seat post assembly 226 includes a first or lower tube 226a and a second or upper tube 226b. The two tubes 226a, 226b are movable relative to each other to establish a height of the seat 228 relative to the frame 202. A head 226c is fixed to a top of the second tube 226b. A seat post motor unit 226d is mounted to the head 226c and a power supply 226e, in this embodiment a removable battery, is attached to the motor unit 226d. The motor unit 226d may include a motor and a gear transmission. The seat post power supply 226e may supply power to the seat post motor unit 226d. The seat post motor unit 226d is configured to supply torque to the components of the seat post assembly 226 to open and close the operable valve.

The front suspension system is shown as a wireless, electrically-actuated front suspension system 230 that allows the suspension characteristics at the front wheel 204 to be dynamically adjusted. Furthermore, the rear suspension system is shown as a wireless, electrically-actuated rear suspension system 232 that allows the suspension characteristics at the rear wheel 206 to be dynamically adjusted. The front and rear suspension systems 230, 232 may further include power supplies such as batteries that supply power to front and rear suspension motor units, respectively. The motor units may be configured to supply torque to the components of the suspension systems to open and close one or more values to change various suspension characteristics.

Figure 2B:
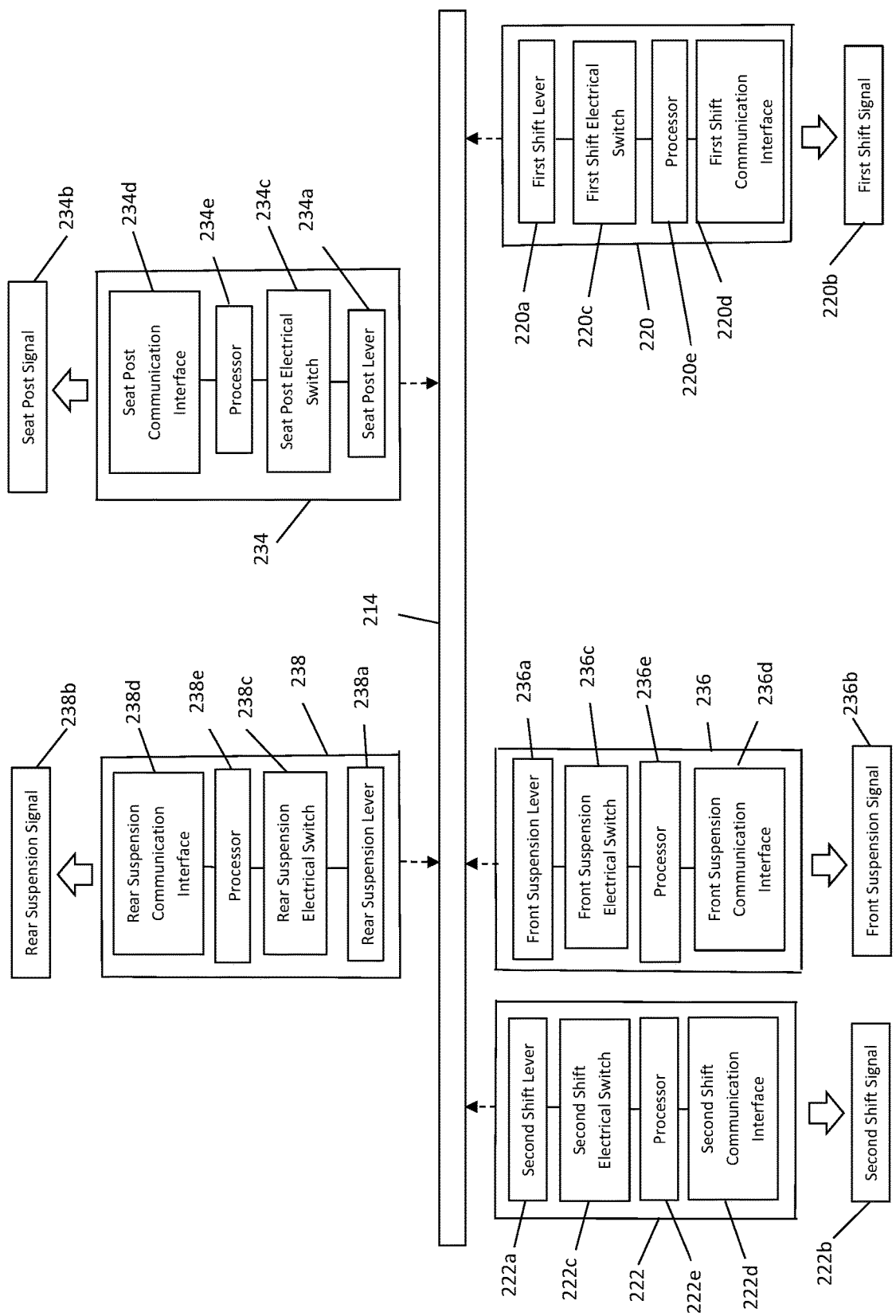
FIG. 2B illustrates a schematic diagram of a handlebar assembly of the example mountain bicycle shown in FIG. 2A and other components coupled to the handlebar assembly.
Figure 2C:
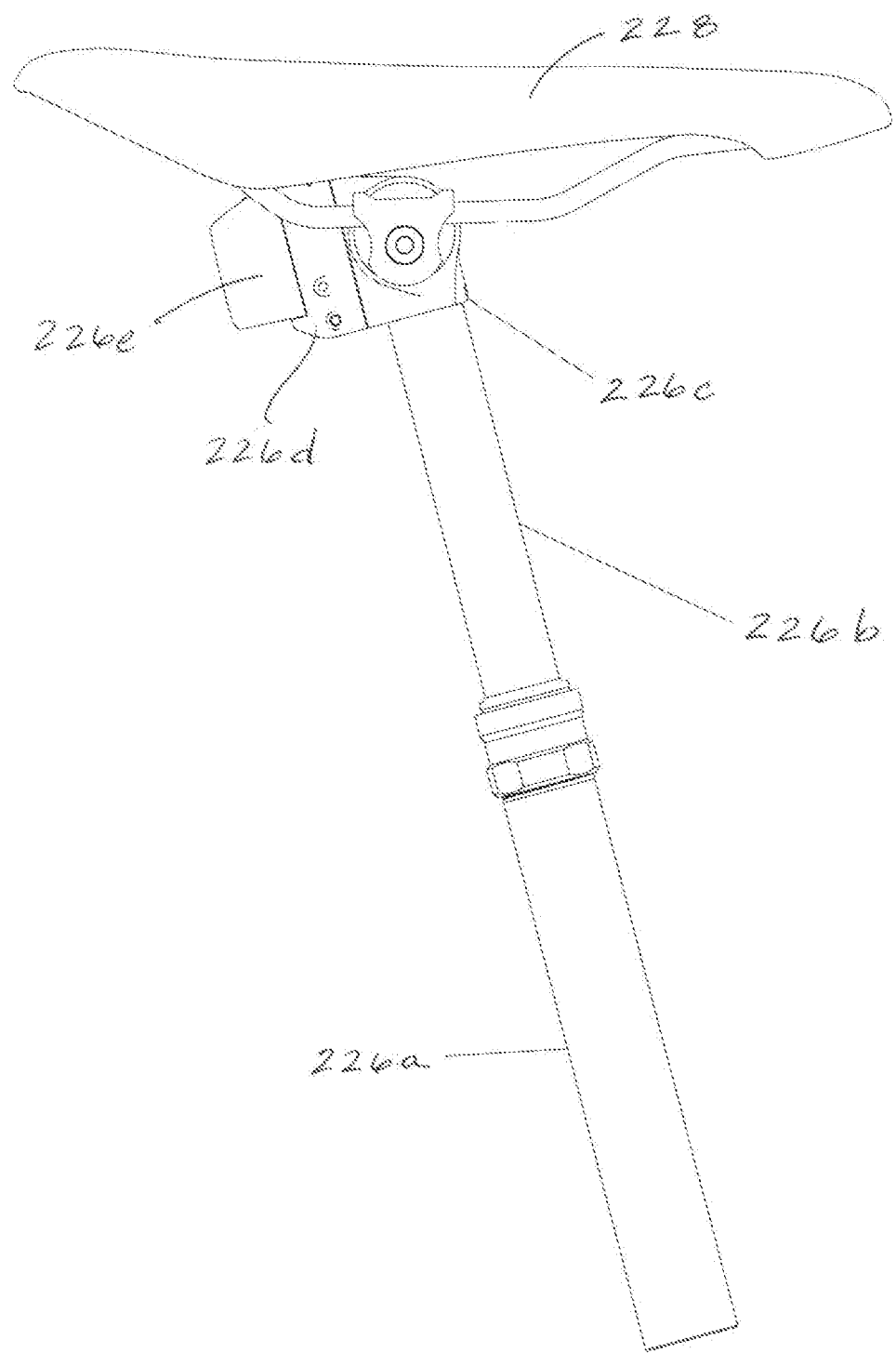
FIG. 2C illustrates a side view of a seat post assembly, with a saddle installed thereon, of the example mountain bicycle shown in FIG. 2A.

Looking to FIGS. 2A and 2B, the bicycle 200 includes a first or right controller device 220 and a second or left controller device 222. The first and second controller device includes first and second electrical switches 220c, 222c that are actuated by first and second input elements, in this embodiment, first and second shift levers 220a, 222a, respectively. The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234 and front and rear suspension controller devices 236, 238 coupled to the handlebar assembly 214.

The user can operate the first shift lever 220a and/or the second shift lever 222a as described above to generate a first shift signal 220b and/or a second shift signal 222b, respectively. Similar to the bicycle 100, the first shift signal 220b and/or the second shift signal 222b can be employed to control the rear derailleur 208f. To allow the user to adjust the height of the seat post assembly 226, the seat post controller device 234 includes a seat post electrical switch 234c that is actuated by a seat post input element 234c such as a lever or button.

To allow the user to adjust the characteristics of the front and rear suspension systems 230, 232, the front and rear suspension controller devices 236, 238 include front and rear suspension electrical switches 236c, 238c that are actuated by suspension input elements 236a, 238a such as levers or buttons. Alternatively, the adjustable seat post assembly 226, the adjustable front suspension system 230, and the adjustable rear suspension system 232 may also be configured to receive the first shift signal 220b and/or the second shift signal 222b, so that these devices can also be controlled by operation of the first shift lever 220a and/or the second shift lever 222a.

The seat post and front and rear suspension controller devices 234, 236, 238 include processors 234e, 236e 238e, respectively, which electronically process the manual input received by the seat post and front and rear suspension input elements 234a, 236a, 238a, respectively. The seat post input triggers a seat post controller communication interface 234d to wirelessly send a seat post signal 234b. The front and rear suspension inputs trigger front and rear controller communication interfaces 236d, 238d to wirelessly send front and rear suspension signals 236b, 238b. Correspondingly, the seat post assembly 226 includes a communication interface and a processor that is configured to receive and electrically process the seat post signal 234b to determine a designated response. The front and rear suspensions include communication interfaces and processors that are configured to receive and electronically process the front and rear suspension signals, respectively, to determine a designated response.

FIGS. 1A-E and 2A-C illustrate how various controller devices can be employed to wirelessly communicate control signals to different combinations of operation-enacting devices. The signals from the controller devices may be communicated wirelessly using any technique, protocol, or standard. For instance, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol. Advantageously, the use of a proprietary protocol can enhance security by limiting access to the wireless network to devices specifically configured to communicate under the proprietary protocol. This may thereby reduce the likelihood of unwanted interference from other wireless devices. The bicycle 100 includes a network coordinator device 124 that may be configured to establish and manage the wireless communications between the various devices as described in further detail below. Similarly, the bicycle 200 includes a network coordinator device 224. Alternatively, one of the controller devices or the operation-enacting devices on the bicycle may be the network coordinator.

Figure 3:
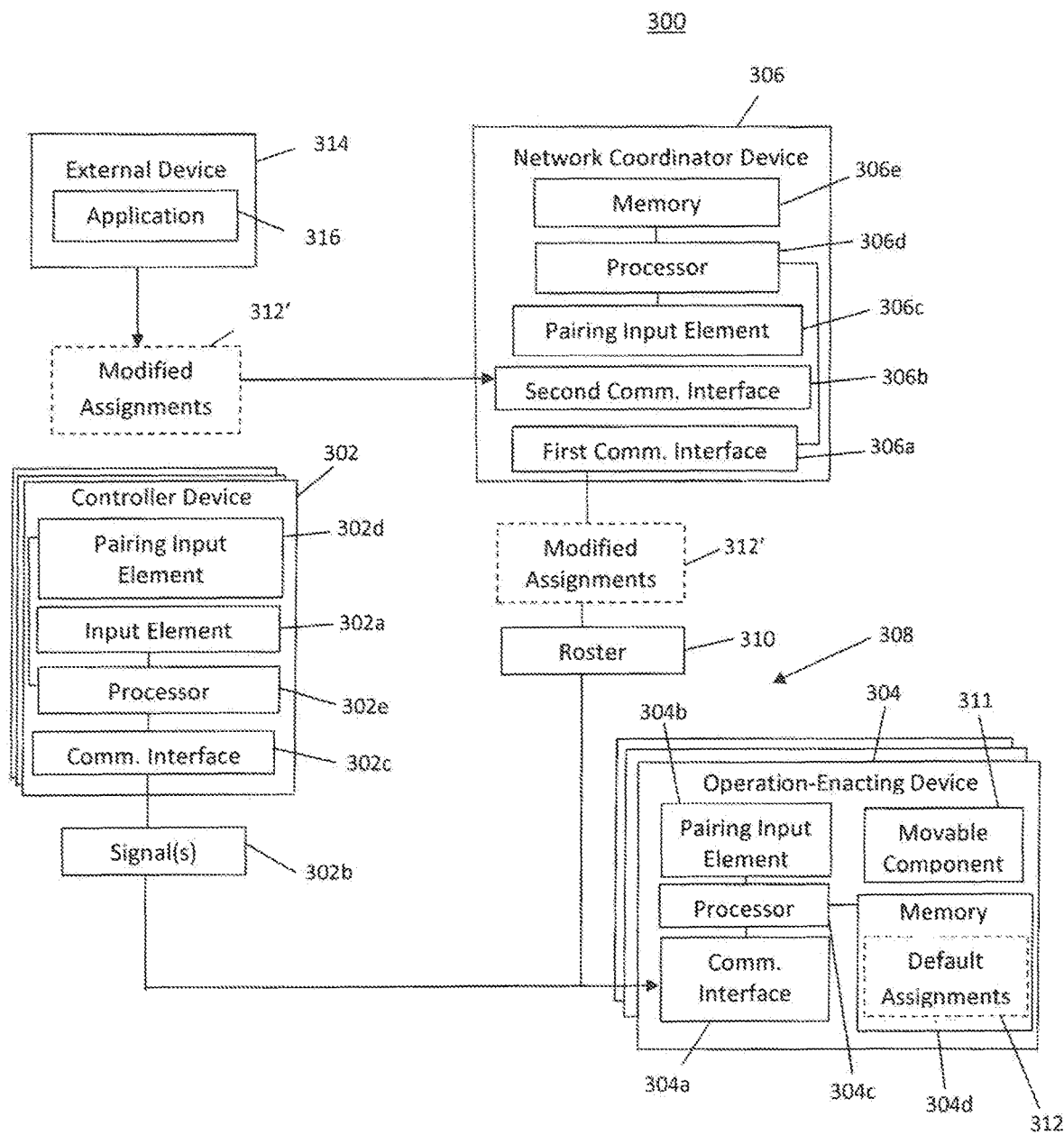
FIG. 3 illustrates an example system for controlling different combinations of operation-enacting devices on a bicycle, according to aspects of the present disclosure.

FIG. 3 illustrates an example system 300 for controlling different combinations of operation-enacting devices on a bicycle. The system 300 includes a plurality of controller devices 302. Each controller device 302 includes at least one respective input element 302a configured to receive input from a user. For instance, as described above, the controller devices 302 may include a right controller device and a left controller device coupled to a handlebar assembly, where respective shifter levers act as input elements 302a. In general, input elements 302a may include any variety of shifter, pushbutton, clicker, switch, other toggled device, sensor (e.g., peddling sensor, etc.), or the like. A single controller device 302 may also include more than one input element 302a, (e.g., two shifter levers, a plurality of pushbuttons, etc.).

The system 300 also includes a plurality of operation-enacting devices 304, where each operation-enacting device 304 is configured to enact at least one respective operation on the bicycle. For instance, the operation-enacting devices 304 may include a front derailleur, a rear derailleur, a height-adjustable seat post assembly, a front suspension system, and/or a rear suspension system as described above. Each operation-enacting device 304 may include at least one movable component 311 configured to modify an operative state of the bicycle. In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device(s).

The system 300 also includes a network coordinator device 306. The network coordinator device 306 includes a first communication interface 306a configured to communicate wirelessly with the controller devices 302 and the operation-enacting devices 304. Using the first communication interface 306a, the network coordinator device 306 can establish a wireless network 308 that enables communications between the network coordinator device 306, the controller devices 302, and the operation-enacting devices 304. Correspondingly, each controller device 302 includes a communication interface 302c and each operation-enacting device 304 includes a communication interface 304a for communicating with other devices, i.e., receiving and transmitting data/signals, on the wireless network 308. Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

Figure 5:
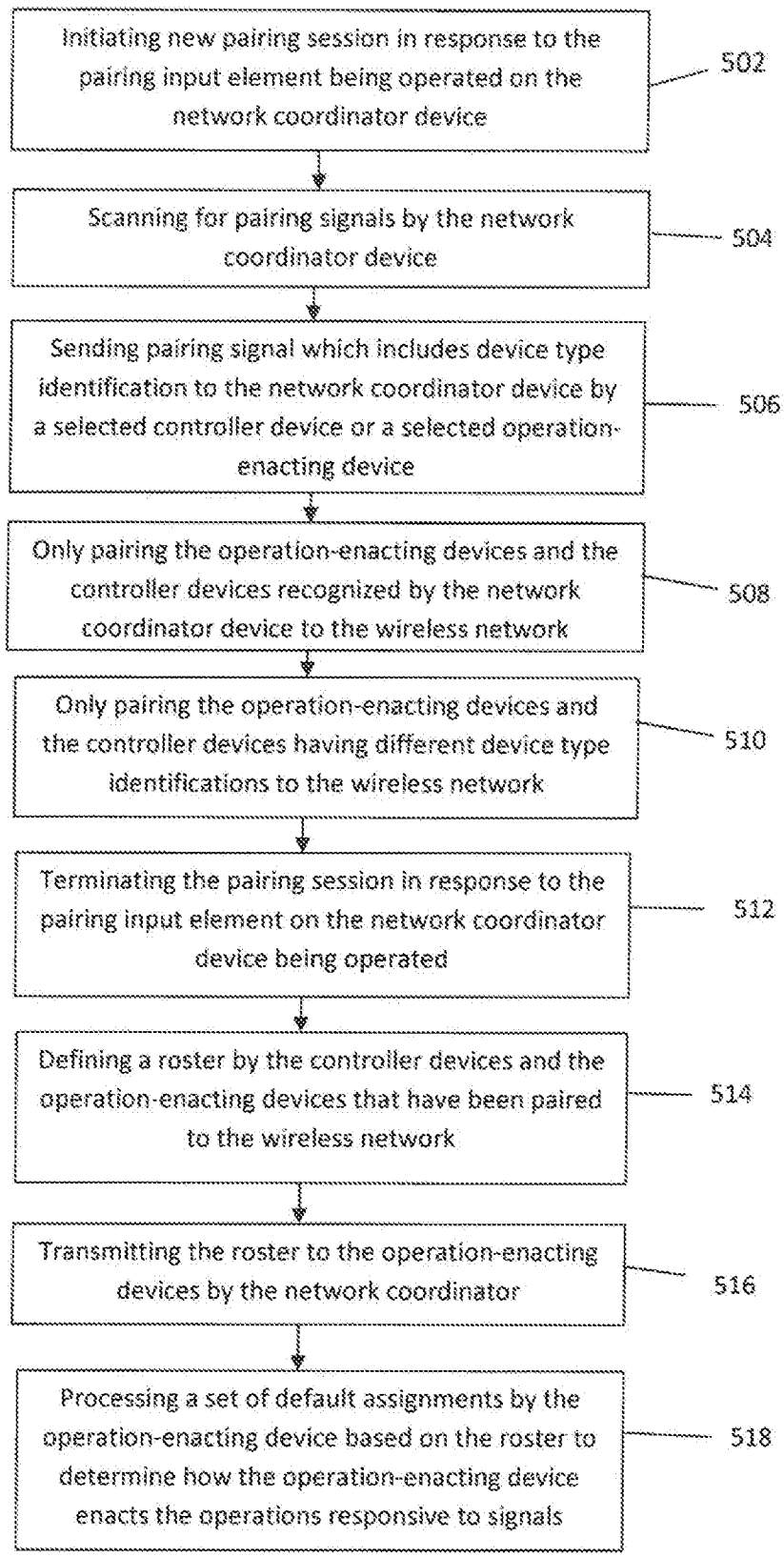
FIG. 5 illustrates a flow chart of an embodiment for a method of establishing a wireless network between controller devices and operation-enacting devices of a bicycle.

FIG. 5 illustrates a method for establishing a wireless network between a network coordinator device, controller devices and operation-enacting devices and establishing a set of default assignments that determine how the operating-enacting devices enact the operations in response to the signals received from the controller devices. The acts of the method presented below are intended to be illustrative. In some embodiment, the method may be accomplished with one or more additional acts not described, and/or without one or more of the acts discussed. Additionally, the order in which the acts of the method are illustrated in FIG. 5 and described below is not intended to be limiting.

In some embodiments, the method may be implemented in one or more processing device (e.g. digital processor, an analog processor, a digital circuit designed to process information, an analog-circuit designed to process information, a state machine, and/or other mechanisms for electronically processing information). The one or more processing devices include one or more devices executing some or all the acts of the method in response to instructions stored electronically on an electronic storage medium. The one or more processing devices configured through hardware, firmware, and/or software to be specifically designed for execution of one or more of the acts of the method.

The network coordinator device 306 is configured to initiate a new pairing session to pair the controller devices 302, and the operation-enacting devices 304 to the wireless network 308. In act 502, the user selects the network coordinator device 306 from among the controller devices 302 and operation-enacting devices 304 by operating a pairing input element 306c such as a pushbutton, switch, or the like that prompts the selected network coordinator device 306 to initiate a new pairing session. While in the pairing mode, in act 504, the network coordinator device 306 scans for pairing signals from other devices. When the new pairing session is active, the user can selectively pair a controller device 302 or an operation-enacting device 304 to the wireless network 308 by operating a corresponding pairing input element 302d, 304b such as a pushbutton, switch, or the like on the given device to be placed into pairing mode. While in pairing mode, in act 506, the selected device transmits a pairing signal to the network coordinator device 306 in response to operation of the pairing input element 302d, 304b of the selected device. In act 508, the pairing signal allows the network coordinator device 306 to recognize the given device and permit the given device to join the wireless network 308. If a proprietary network protocol is employed for the wireless network 308, only devices configured to communicate according to the proprietary network protocol can be recognized by the network coordinator device 306 and paired.

In some embodiments, in act 506, the pairing signal from a given device provides a respective device type identification, and the network coordinator device 306 only pairs devices having different respective device type identifications in act 510. For instance, the pairing signal may identify a given device to be a rear derailleur. By limiting the pairings to devices with different respective device type identifications, the system 300 will not include more than one rear derailleur. As such, an unknown device cannot imitate another device type that has already been selected for pairing.

In act 512, the user can manually end the pairing session, e.g., by operating the pairing input element 306c on the network coordinator device 306. Alternatively, the network coordinator device 306 may automatically end the pairing session after a set time period has elapsed.

In act 514, a roster 310 is defined by the controller devices 302 and the operation-enacting devices 304 that have been paired to the wireless network 308 at the end of the pairing session. To enhance the integrity of the system 300, no other devices can be paired to the wireless network 308 after the pairing session has ended. By fixing the roster 310, the system 300 only includes the devices 302, 304 selected by the user. This blocks unauthorized devices from joining the wireless network 308 and maliciously or accidentally interfering with the operation of the devices 302, 304 actually selected by the user.

In act 516, when the pairing session ends, the network coordinator device 306 is configured to transmit, to the operation-enacting devices 304, the roster 310 identifying the controller devices 302 and the operation-enacting devices 304 paired to the wireless network 308. In act 518, the operation-enacting devices 304 are configured to determine, based on the roster 310 received from the network coordinator device 306, how to enact operations in response to the signals 302b received from the controller devices 302.

If desired, a new pairing session can be initiated with the network coordinator device 306 to reset the roster 310 and to pair a different set of devices 302, 304. Upon the end of the new pairing session, this different set of devices defines a new roster 310. The new pairing session unpairs and resets all devices that may have been added to the wireless network 308 in a previous pairing session. In general, paired devices 302, 304 cannot be removed from the roster 310 and new devices cannot be added to the roster 310 until a new pairing session is initiated. A device paired to the wireless network 308 can be paired into another wireless network (e.g., on another bicycle system), but that device cannot rejoin the prior wireless network 308 because it is reset when paired to the other wireless network.

The controller devices 302 are configured to transmit, to the operation-enacting devices 304, signals 302b indicating input received by the input elements 302a of the controller devices 302. For instance, the first controller device 120 and the second controller device 122 may wirelessly transmit a first shift signal 120b and a second shift signal 120a as described above to indicate input received by the first shift lever 120a and the second shift lever 122a, respectively.

The operation-enacting devices 304 are configured to process a default set of assignments 312 based on the roster 310 to determine how the operation-enacting devices 304 enact the operations responsive to the signals 302b. The default set of assignments 312 can be transmitted to the each operation-enacting device 304 by the network coordinator device 306, and/or stored locally on each operation-enacting device 304.

For example, after a pairing session is completed, the roster 310 may include a right controller device with a right shift lever, a left controller device with a left shift lever, a front derailleur, and a rear derailleur. The default set of assignments 312 controlling the operation of the operation-enacting devices 304 is determined according to the particular set of devices in the roster 310. For instance, the default set of assignments 312 may provide that with the example roster 310 above: (i) the rear derailleur shifts the chain to a sprocket on the left in response to signals from the left controller device (with no signals from the right controller device); (ii) the rear derailleur shifts the chain to a sprocket on the right in response to signals from the right controller device (with no signals from the left controller device); and (iii) the front derailleur shifts the chain to an alternate chainring in response to simultaneous signals from the right controller device and the left controller device. If the roster 310 includes a different set of devices, the default set of assignments 312 may be different. For example, if the roster 310 includes a height-adjustable seat post assembly and does not include a front derailleur, the seat post assembly lowers the seat in response to the simultaneous signals from the right and left controller devices.

A paired device is considered to remain in the wireless network 308 and the roster 310 does not change even if the paired device becomes inactive or unavailable (e.g., if it loses power or is re-paired to another wireless network).

Each operation enacted by the corresponding operation-enacting device 304 occurs only in response to the signals 302b from a single assigned controller device 302 or a single assigned combination of controller devices 302 as described below. For instance, an operation may involve shifting the chain to a sprocket on the left or inboard with the rear derailleur and such operation only occurs in response to signals from the left controller device. Advantageously, this reduces the likelihood of an unwanted response by an operation-enacting device 304 to a signal from an unknown device.

When a combination of more than one controller device is employed to produce simultaneous signals, e.g., simultaneous signals from the right controller device and the left controller device, the combination of controller devices may be considered to be a single virtual controller device. Thus, an operation may involve the front derailleur shifting the chain to an alternate chainring, and such operation only occurs in response to signals from the single virtual controller device defined by the combination of the right controller device and the left controller device. Alternatively, a single virtual device may be provided by simultaneous signals from two or more inputs on a single device, e.g., simultaneous presses of pushbuttons on a single unified shifter device.

Figure 6:
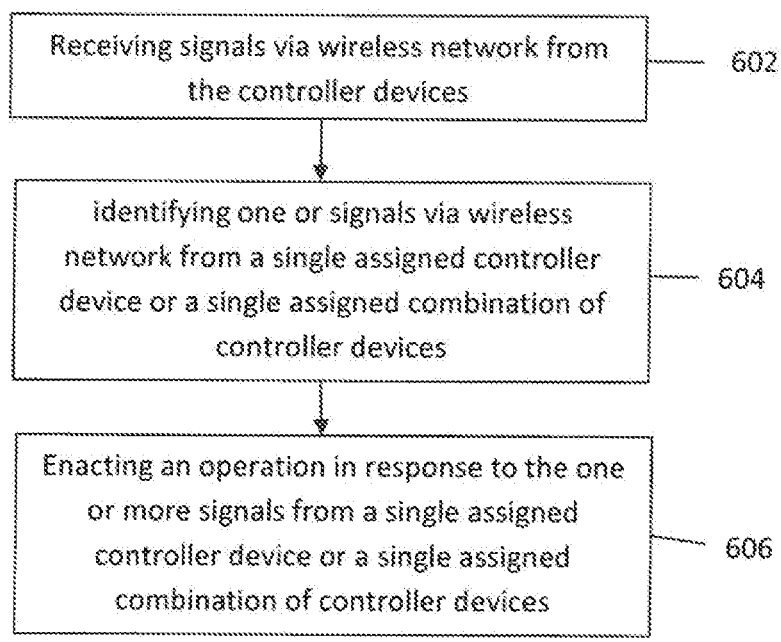
FIG. 6 illustrates a flow chart of an embodiment for a method of method for controlling operation-enacting devices of a bicycle.

FIG. 6 illustrates a method for controlling the operation-enacting devices. Once the roster 310 is established and the default set of assignments 312 is determined according to the roster 310, in act 602, each operation-enacting device 304 can receive, via the wireless network 308, the signals 302b from the controller devices 302. In act 604, each operation-enacting device 304 can identify the one or more signals 302b from an assigned controller device 302 or from an assigned combination of controller devices. In act 606, each operation-enacting device enacts the operation in response to the one or more signals 302b from the assigned controller device 302 or assigned combination of controller devices 302.

Although the default set of assignments 312 may provide an effective approach for determining how the operation-enacting devices 304 should respond to the signals 302b from the controller devices 302, the user may prefer to use a modified set of assignments 312'. For instance, the modified set of assignments 312' may provide that with the example roster 310 above: (i) the rear derailleur shift the chain to the sprocket on the left in response to signals from the right controller device that do not exceed a threshold amount of time (without signals from the left controller device); (ii) the rear derailleur shift the chain to the sprocket on the right in response to signals from the right controller device that meet or exceed the threshold amount of time (without signals from the left controller device); and (iii) the front derailleur shift the chain to an alternate chainring in response to signals from the left controller device.

In some cases, the user may provide a modified set of assignments 312' where an operation-enacting device 304 does not respond to signals 302b from any controller device 302. For instance, with the example roster 310 above, the modified set of assignments 312' may alternatively provide that: (i) the rear derailleur shifts the chain to a sprocket on the left in response to signals from the left controller device (with no signals from the right controller device); (ii) the rear derailleur shifts the chain to a sprocket on the right in response to signals from the right controller device (with no signals from the left controller device); and (iii) the front derailleur remains idle regardless of what signals are transmitted by the left controller device and/or the right controller device. In general, not every operation by an operation-enacting device 304 must be assigned to an input received by a controller device 302.

Accordingly, aspects of the present disclosure allow the assignments between the controller devices 302 and the operation-enacting devices 304 to be modified to reconfigure the system 300. As shown further in FIG. 3, the network coordinator device 306 may include a second wired and/or wireless communication interface 306b configured to receive the modified set of assignments 312', where the modified set of assignments 312' causes at least one operation enacted by a operation-enacting device 304 to occur in response to the signals 302b from a different controller device 302. The second communication interface 306b may employ a different protocol than the first communication interface 306a, particularly if the first communication interface 306a employs a proprietary protocol.

Figure 7:
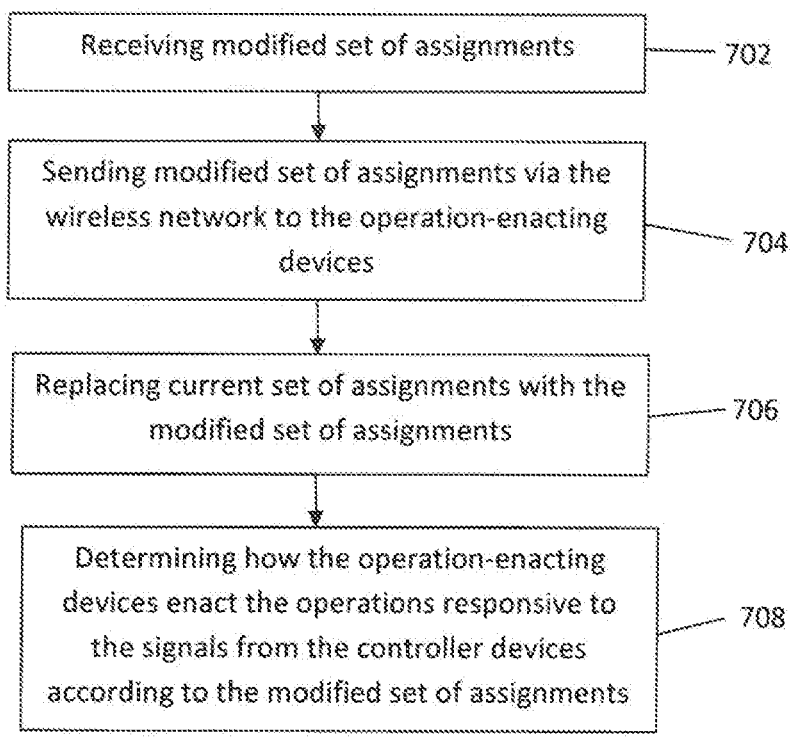
FIG. 7 illustrates a flow chart of an embodiment for a method of modifying the default or current set of assignments of a bicycle.

FIG. 7 illustrates a method of modifying the default or current set of assignments. In act 702, the network coordinator device 306 receives a modified set of assignments 312'. In act 704, the network coordinator device 306 is configured to transmit, via the wireless network 308, the modified set of assignments 312' to the operation-enacting devices 304. Correspondingly, in act 706, the operation-enacting devices 304 are configured to replace the default or current set of assignments 312 with the modified set of assignments 312'. In act 708, the operation-enacting devices 304 are configured to determine how the operation-enacting devices 304 enact operations in response to the signals 302b according to the modified set of assignments 312'. If desired, the user can modify the set of assignments again in a similar manner.

According to some embodiments, the second communication interface 306b is configured to wirelessly couple the network coordinator device 306 to an external computing device 314, such as a smart phone, computing tablet, laptop, personal computer, or the like. The external computing device 314 may include an application 316, such as a mobile application or other computer software. The application 316 is configured to receive the modified set of assignments 312' from a user and to transmit the modified set of assignments 312' to the network coordinator device 306.

Figure 4A:
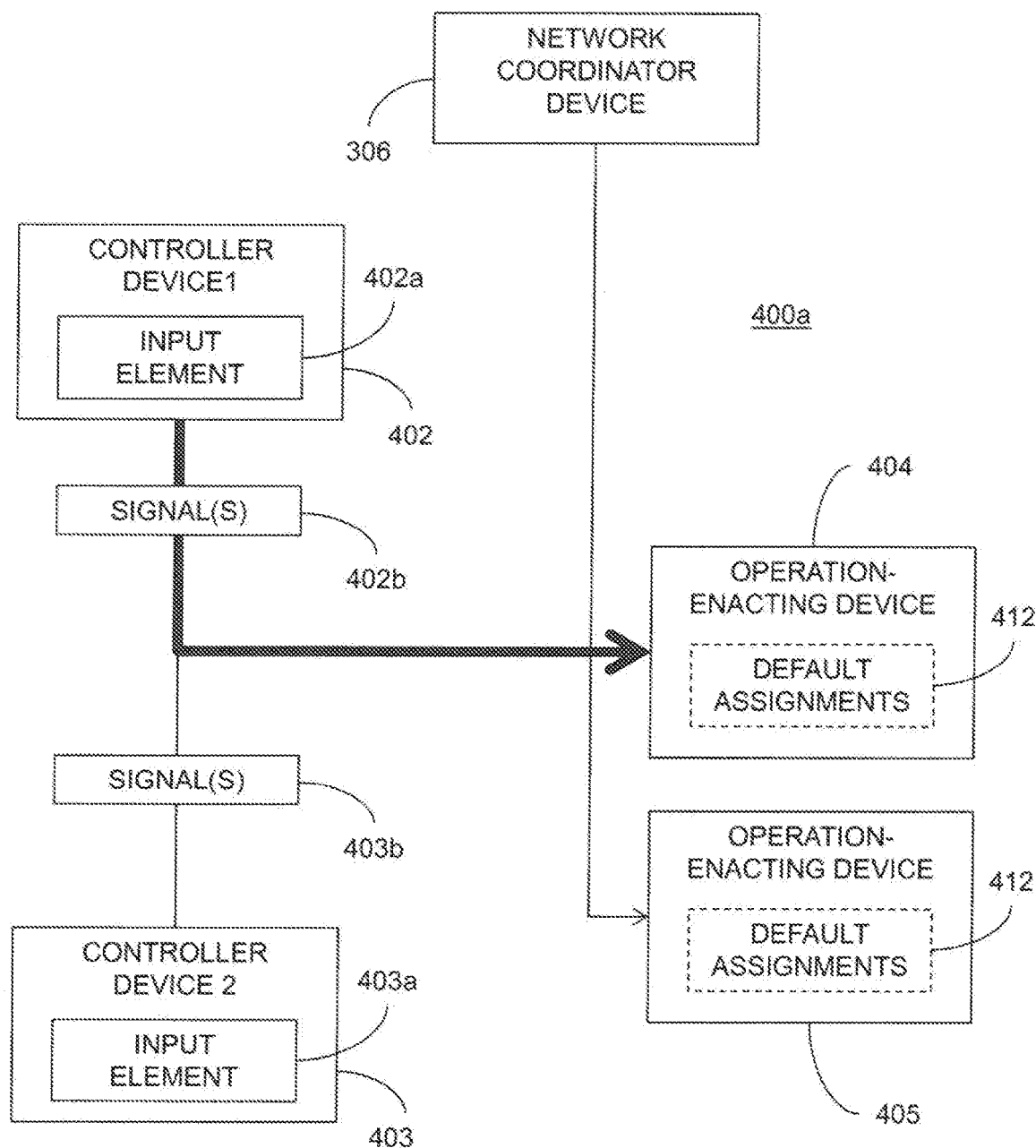
FIG. 4A illustrates an example scenario where operation-enacting devices respond to signals from controller devices according to a first set of assignments, according to aspects of the present disclosure.
Figure 4B:
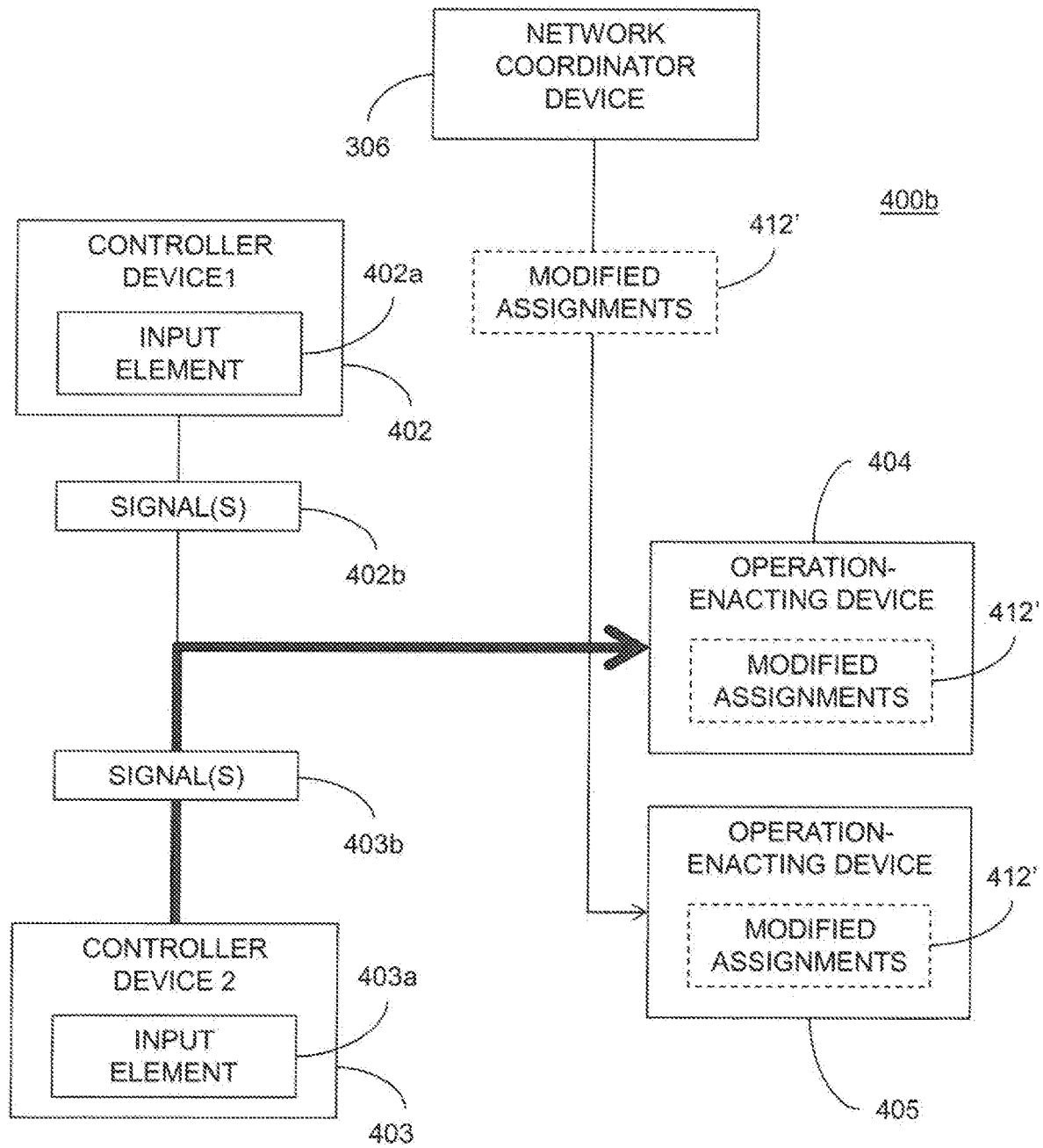
FIG. 4B illustrates an example scenario where operation-enacting devices respond to signals from controller devices according to a second set of assignments, according to aspects of the present disclosure.
Figure 4C:
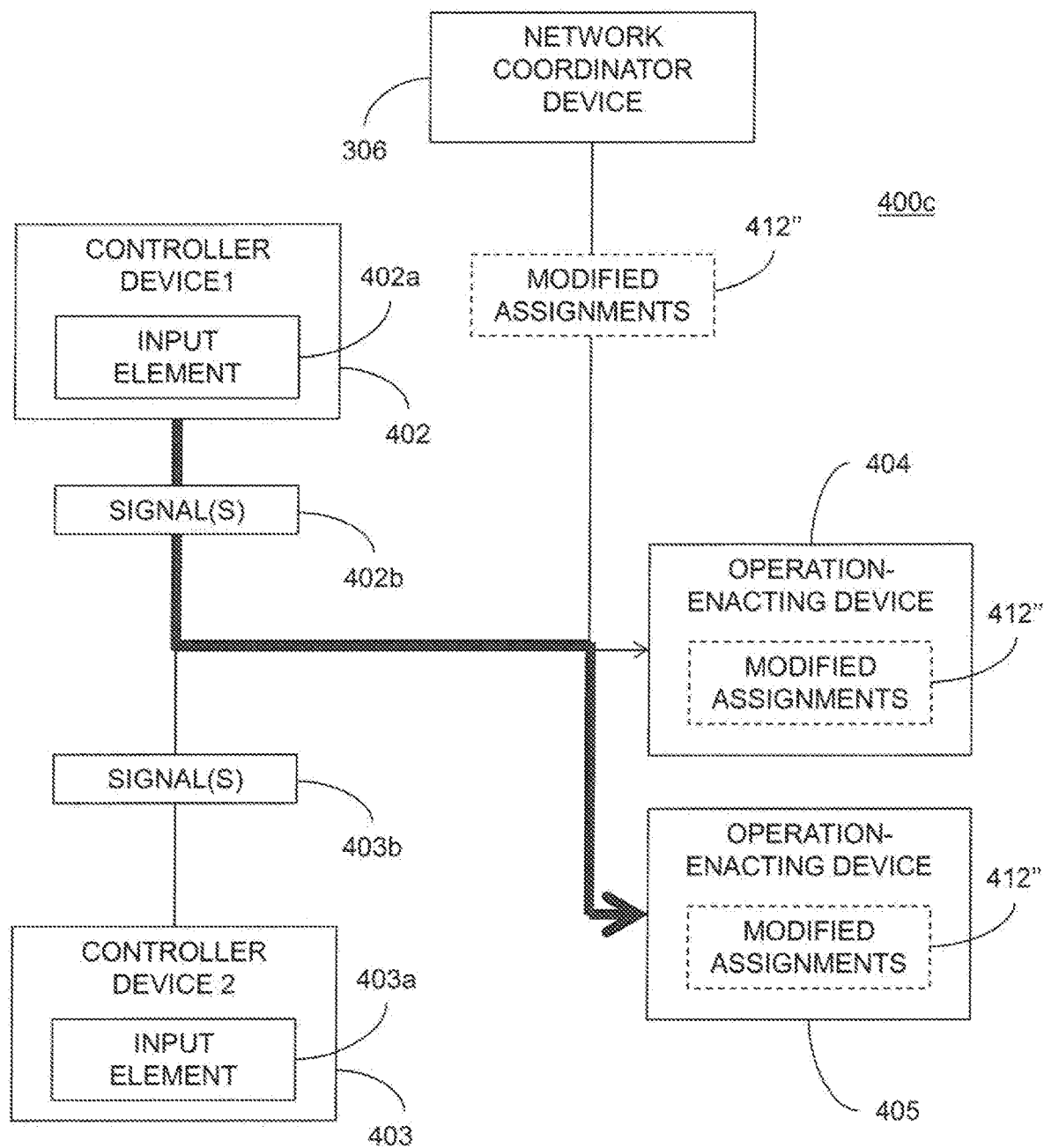
FIG. 4C illustrates an example scenario where operation-enacting devices respond to signals from controller devices according to a third set of assignments, according to aspects of the present disclosure.

FIGS. 4A-C illustrate example scenarios 400a-c that further demonstrate how a modified set of assignments may be implemented in the system 300. The controller devices 302 paired to the wireless network 308 include a first controller device 402 and a second controller device 403. The first controller device 402 includes a first input element 402a configured to receive a first input from the user, where the first input modifies a state of the first input element 402a. The second controller device 403 includes a second input element 403a configured to receive a second input from the user, where the second input modifies a state of the second input element 403a. For instance, the first input element 402a may be a right shift lever and the second input element 403a may be a left shift lever. The user can engage either shift lever so that the state of the shift lever can be modified to any of the following: (i) an active state when engaged by the user for less than a threshold amount of time, (ii) an inactive state when not engaged by the user, or (iii) an update state when continuously engaged by the user for at least the threshold amount of time. The signals 302b from the controller devices 302 include a first signal 402b from the first controller device 402 and a second signal 403b from the second controller device 403, where the first signal 402b indicates the modified state of the first input element 402a and the second signal 403b indicates the modified state of the second input element 403a. The signals 302b from a particular controller device 302 may include a device type identification for the particular controller device 302, an input identifier for the input element 302a on the particular controller device 302 (in case there is more than one input element 302a), and information on the modified state for the input element 302a.

The operation-enacting devices 304 include a first operation-enacting device 404 and a second operation-enacting device 405. For instance, the first operation-enacting device 404 may be a front suspension system and the second operation-enacting device 405 may be a rear suspension system. According to a first set of assignments 412 shown in FIG. 4A, the first operation-enacting device 404 is configured to (i) identify the first signal 402b among the signals 302b received from the controller devices 302, (ii) identify the modified state of the first input element 402a, and (iii) enact a first operation on the bicycle in response to the modified state of the first input element 402a.

As shown in FIG. 4B, the network coordinator device 306 is configured to (i) receive a second set of assignments 412', and (ii) transmit the second set of assignments 412' to the first operation-enacting device 404 via the wireless network 308. The first operation-enacting device 404 is configured to receive the second signal 403b from the second controller device 403 via the wireless network 308. Responsive to receiving the second set of assignments 412', the first operation-enacting device 404 is modified to: (i) identify the modified state of the second input element 403a, (ii) enact the first operation on the bicycle in response to the modified state of the second input element 403a, and (iii) remain idle in response to the first signal from the first controller device 402.

As shown in FIG. 4C, the network coordinator device is configured to (i) receive a third set of assignments 412", and (ii) transmit the third set of assignments 412" to the operation-enacting devices 304 via the wireless network 308. The second operation-enacting device 405 is configured to receive the first signal 402b from the first controller device 402 via the wireless network 308. Responsive to receiving the third set of assignments 412", (i) the second operation-enacting device 405 is configured to identify the modified state of the first input element 402a and to enact a second operation on the bicycle in response to the modified state of the first input element 402a, and (ii) the first operation-enacting device 404 is modified to remain idle in response to the first signal from the first controller device.

Accordingly, the embodiments described above provide a reconfigurable control system for the components of the bicycle. Despite this desirable feature, the embodiments can secure the control system against such access by unknown devices. In particular, the embodiments initiate a pairing session that allows the user to select controller devices and operation-enacting devices for the wireless network. Once the pairing session is complete, the roster of devices paired to the network is fixed and unchangeable, even though the assignments between the controller devices and the operation-enacting devices already on the network can still be changed by the user. As such, unknown devices cannot join the wireless network and interfere with the control system. Additionally, the embodiments do not allow duplicate device types to be paired to the wireless network, so that an unknown device cannot imitate another device that has been selected to be paired by user. Further, the embodiments only permit each operation enacted by an operation-enacting device to occur in response to the signals from a single assigned controller device or a single assigned combination of controller devices thereby reducing the likelihood of an unwanted response by an operation-enacting device to a signal from an unknown device. Moreover, the embodiments may employ a proprietary network protocol to enhance security by limiting access to the wireless network to devices that can operate under the protocol.

Aspects of the embodiments engage in computer processing, for instance, to receive and transmit wireless signals and to determine how to respond to such signals. For example, the network coordinator device 306 may include one or more processors 306d configured to execute program instructions stored on computer-readable media 306e, which when executed cause the one or more processors 306d to: (i) establish, via the first communication interface 306c, a pairing session that allows the controller devices 302 and the operation-enacting devices 304 to be paired to a wireless network 308, and (ii) transmit to the operation-enacting devices 304, via the first communication interface 306c, a roster 310 identifying the controller devices 302 and the operation-enacting devices 304 paired to the wireless network 308.

For another example, an operation-enacting device 304 may include one or more processors 304c configured to execute program instructions stored on computer-readable media 304d, the program instructions causing the one or more processors 306d to process the default set of assignments 312 based on the roster 310, where the default set of assignments 312 indicates which of the controller devices 302 is selected to cause the operation-enacting device 304 to respond by modifying the operative state of the bicycle.

Additionally, the one or more processors 304c of the operation-enacting devices 304 receives, via the communication interface 304a, a modified set of assignments 312' from the network coordinator device 306, where the modified set of assignments 312' causes the operation-enacting device 304 to modify the operative state of the bicycle in response to the signals 302b from a different one of the controller devices, and the program instructions cause the one or more processors 304c to replace the default or current set of assignments 312 with the modified set of assignments 312'.

The one or more processors 302e, 304c, 306d employed by the embodiments may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

Aspects of the embodiments may also employ computer memory. Such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

To power wireless communications and computer processing, embodiments employ power supplies, which may be stored internal to the operating device, or stored external to the operating device. The power supply may include a combination of multiple batteries or other power providing devices. Specially fitted or configured battery types, or standard battery types such as CR 2012, CR 2016, and/or CR 2032 may be used. In some embodiments, the devices in a system are all individually powered, e.g. by a dedicated battery.

As described above, the embodiments employ communication interfaces. Such communication interfaces are configured to send data such as control signals and/or commands to bicycle components. In particular, the communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

It is understood that the illustration or other representation of devices, such as the network coordinator devices, the controller devices, and the operation-enacting devices, include (even if not expressly labeled) any combination of processor(s), memory device(s) (e.g., computer-readable media storing program instructions for execution by processor(s)), communication interface(s), and power supply necessary to achieve the disclosed features.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system for a bicycle, comprising:
   a plurality of controller devices, wherein each controller device includes at least one respective input element configured to receive input from a user;
   a plurality of operation-enacting devices, wherein each operation-enacting device is configured to enact at least one respective operation on the bicycle; and
   a network coordinator device configured to (i) establish a wireless network that enables communications between the network coordinator device, the controller devices, and the operation-enacting devices, and (ii) transmit to the operation-enacting devices, via the wireless network, a roster identifying the controller devices paired to the wireless network and the operation-enacting devices paired to the wireless network,
   wherein the controller devices are further configured to transmit to the operation-enacting devices, via the wireless network, signals indicating input received by the input elements of the controller devices, and
   wherein the operation-enacting devices are configured to determine, based on the roster received from the network coordinator device, how to enact the operations responsive to the signals received from the controller devices.

2. The system of claim 1, wherein the operation-enacting devices are configured to process a default set of assignments based on the roster to determine how the operation-enacting devices enact the operations responsive to the signals, the default set of assignments causing each operation to be enacted by the corresponding operation-enacting device only in response to one or more of the signals from a single assigned controller device or a single assigned particular combination of controller devices.

3. The system of claim 2, wherein each operation-enacting device is further configured to (i) receive, via the wireless network, the signals from the controller devices, (ii) identify the signals from the assigned controller device, and (iii) enact the operation in response to the signals from the assigned controller device.

4. The system of claim 2, wherein the network coordinator device includes a communication interface configured to receive a modified set of assignments, the modified set of assignments causing at least one of the operations to be enacted by the corresponding operation-enacting device in response to one or more of the signals from a different one of the controller devices,
   the network coordinator device is configured to transmit, via the wireless network, the modified set of assignments to the operation-enacting devices, and
   the operation-enacting devices are configured to replace the default set of assignments with the modified set of assignments and to determine how the operation-enacting devices enact the operations responsive to the signals according to the modified set of assignments.

5. The system of claim 1, wherein, the network coordinator device, the operation-enacting devices, and the controller are further configured such that when the network coordinator device establishes the wireless network, the operation-enacting devices and the controller devices each provide a respective device type identification, and the network coordinator device only pairs, to the wireless network, the operation-enacting devices and the controller devices having different respective device type identifications.

6. The system of claim 1, wherein the controller devices include a first controller device and the operation-enacting devices include a first operation-enacting device,
- the first controller device includes a first input element configured to receive a first input from the user, the first input modifying a state of the first input element,
- the signals include a first signal from the first controller device, the first signal indicating the modified state of the first input element, and
- according to a first set of assignments, the first operation-enacting device is configured to (i) identify the first signal among the signals received from the controller devices, (ii) identify the modified state of the first input element, and (iii) enact a first operation on the bicycle in response to the modified state of the first input element.

7. The system of claim 6, wherein the first input element is configured such that the state of the first input element can be modified to any of the following: (i) an active state when engaged by the user for less than a threshold amount of time, (ii) an inactive state when not engaged by the user, or (iii) an update state when continuously engaged by the user for at least the threshold amount of time.

8. The system of claim 6, wherein the network coordinator device is configured to (i) receive a second set of assignments, and (ii) transmit the second set of assignments to the first operation-enacting device via the wireless network,
- the controller devices include a second controller device,
- the second controller device includes a second input element configured to receive a second input from the user, the second input modifying a state of the second input element,
- the signals include a second signal from the second controller device, the second signal indicating the modified state of the second input element,
- the first operation-enacting device is configured to receive the second signal from the second controller device via the wireless network, and
- responsive to receiving the second set of assignments, the first operation-enacting device is modified to: (i) identify the modified state of the second input element, (ii) enact the first operation on the bicycle in response to the modified state of the second input element, and (iii) remain idle in response to the first signal from the first controller device.

9. The system of claim 6, wherein the network coordinator device is configured to (i) receive a second set of assignments, and (ii) transmit the second set of assignments to the operation-enacting devices via the wireless network,
- the operation-enacting devices include a second operation-enacting device,
- the second operation-enacting device is configured to receive the first signal from the first controller device via the wireless network, and
- responsive to receiving the second set of assignments, (i) the second operation-enacting device is configured to identify the modified state of the first input element and to enact a second operation on the bicycle in response to the modified state of the first input element, and (ii) the first operation-enacting device is modified to remain idle in response to the first signal from the first controller device.

10. The system of claim 1, wherein one of the operations acts on more than one component of the bicycle.

11. The system of claim 1, wherein one of the operations includes more than one act on one or more components of the bicycle.

12. A network coordinator device for a bicycle, comprising:
- a first communication interface configured to communicate wirelessly with a plurality of controller devices and a plurality of operation-enacting devices, each controller device including at least one respective input element configured to receive input from a user, and each operation-enacting device being configured to enact at least one respective operation on the bicycle; and
- one or more processors configured to execute program instructions stored on computer-readable media, which when executed cause the one or more processors to:
- establish, via the first communication interface, a pairing session that allows the controller devices and the operation-enacting devices to be paired to a wireless network, and
- transmit to the operation-enacting devices, via the first communication interface, a roster identifying the controller devices and the operation-enacting devices paired to the wireless network,
- wherein the wireless network allows the controller devices to transmit, to the operation-enacting devices, signals indicating input received by the input elements of the controller devices and causing the operation-enacting devices to enact the operations based on the roster.

13. The network coordinator device of claim 12, wherein the network coordinator device includes a second communication interface configured to receive a set of assignments, the set of assignments determining how the operation-enacting devices enact the operations responsive to the signals received from the controller devices, and
- the program instructions cause the one or more processors to transmit, via the first communication interface, the set of assignments to the operation-enacting devices.

14. The network coordinator device of claim 13, wherein the second communication interface is configured to be wirelessly coupled to an external computing device including an application, the application receiving the set of assignments from a user and transmitting the set of assignments to the second communication interface.

15. The network coordinator device of claim 12, wherein, when the one or more processors establishes the pairing session, the operation-enacting devices and the controller devices each provide a respective device type identification, and the one or more processors only allows the operation-enacting devices and the controller devices having different respective device type identifications to be paired to the wireless network.

16. An operation-enacting device for a bicycle, comprising:
- at least one movable component configured to modify an operative state of the bicycle; and
- a communication interface configured to communicate wirelessly with a network coordinator device and a plurality of controller devices,
- wherein the network coordinator device establishes a pairing session to pair the operation-enacting device, the controller devices, and other operation-enacting devices to a wireless network,
- the communication interface receives (i) from the network coordinator device, a roster identifying the controller devices and other operation-enacting devices paired to the wireless network, and (ii) from the controller devices, signals indicating input received by input elements of the controller devices, and based on the roster received from the network coordinator, the at least one movable component modifies the operative state of the bicycle responsive only to the signals from a selected one of the controller devices.

17. The operation-enacting device of claim 16, further comprising one or more processors configured to execute program instructions stored on computer-readable media, the program instructions causing the one or more processors to process a default set of assignments based on the roster, the default set of assignments indicating which of the controller devices is selected to cause the at least one movable component to respond by modifying the operative state of the bicycle.

18. The operation-enacting device of claim 17, wherein the one or more processors receives, via the communication interface, a modified set of assignments from the network coordinator device, the modified set of assignments causing the at least one movable component to modify the operative state of the bicycle in response to the signals from a different one of the controller devices, and the program instructions cause the one or more processors to replace the default set of assignments with the modified set of assignments.

19. The operation-enacting device of claim 17, wherein the communication interface transmits a device type identification to the network coordinator device, and the network coordinator device pairs the controller device to the wireless network only if the device type identification is different from device type identifications associated with the controller devices and the other operation-enacting devices.

20. The operation-enacting device of claim 17, wherein the at least one movable component includes at least one of: (i) a front derailleur configured to modify a position of a bicycle chain relative to a set of front gears, (ii) a rear derailleur configured to modify a position of the bicycle chain relative to a set of rear gears, or (iii) a seat post assembly configured to modify a position of a seat relative to a frame of the bicycle.

* * * * *